Dec. 7, 1943.          G. E. WILKINS          2,336,204
                       SPEED GOVERNOR
                     Filed May 14, 1942

INVENTOR.
Gordon E. Wilkins
BY
Harry G. Schroeder

Patented Dec. 7, 1943

2,336,204

UNITED STATES PATENT OFFICE 2,336,204

SPEED GOVERNOR

Gordon E. Wilkins, Oakland, Calif.

Application May 14, 1942, Serial No. 442,981

3 Claims. (Cl. 74—526)

This invention relates to devices by means of which the operating speeds of engines or the like may be governed so as to not substantially exceed a predetermined rate.

It is an object of the invention to provide a simple device, adapted to be associated with the foot throttle of an automobile, which is designed to prevent the condition known as "heavy foot", frequently experienced by drivers during long trips, which is caused by fatigue in endeavoring to maintain a constant pressure on the foot throttle, so as to maintain a uniform speed of the vehicle, and which results in the driver unconsciously gradually increasing foot pressure on the throttle with the result that the vehicle attains a dangerous speed or greatly exceeds the legal speed limit.

Another object of the invention is to provide a device of the class described which, although affording means for maintaining the speed of a vehicle at a uniform maximum rate, permits the driver to increase the vehicle speed whenever there is need for such a speed increase.

A further object of the invention is to provide a speed governing device for automobiles or the like which may be readily adjusted so as to raise or lower the normal operating speed of the vehicle.

The invention possesses other objects and features of advantage which, together with the foregoing, will be specifically brought out in the detailed description of the preferred form of my invention hereunto annexed. Although I have chosen to disclose my invention as associated with the apparatus shown, it is to be understood that the invention is capable of incorporation with other similar devices without departing from the spirit of the invention and to the extent indicated by the appended claims.

Referring to the drawing.

The high-speed, powerful engines in modern automobiles and trucks are so sensitively responsive to acceleration and the foot pressure necessary to actuate the foot throttle control of such engines is so slight that most drivers find it very difficult to maintain the speed of a vehicle below a certain maximum rate without very frequent reference to the speedometer. During a long drive, although in some cases the condition asserts itself in a very short time, when the driver is required to maintain a steady and unvarying pressure on the foot throttle, nervous and muscular fatigue will become evident in the driver's leg with the result that the driver, unconsciously, gradually increases the pressure on the foot throttle and soon finds that the vehicle is travelling at a dangerous or law-breaking speed. I have provided a simple device, which may be attached to the vehicle, to operate in association with the foot throttle or the carburetor control system, for lessening this tendency of increased pedal pressure when the driver's leg becomes tired.

Figure 1:
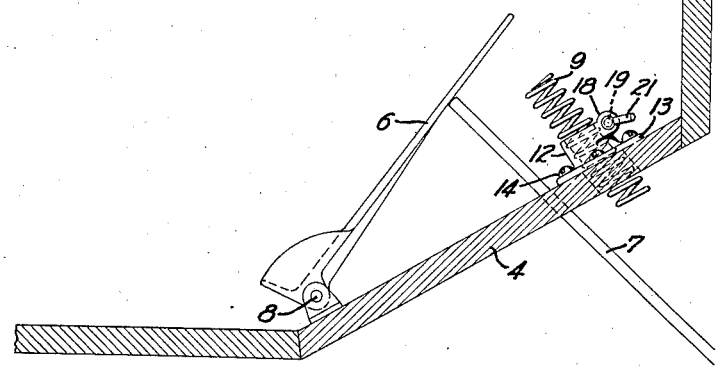
Figure 1 is a vertical sectional view of a portion of the floor structure of an automobile showing the governor of my invention associated with the foot throttle of the vehicle.
Figure 2:
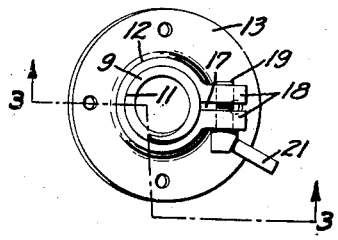
Figure 2 is a top plan view of the governor alone.
Figure 3:
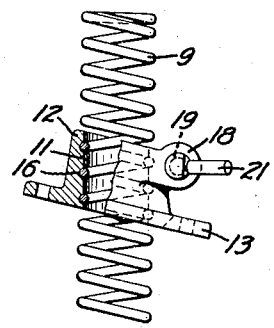
Figure 3 is a side elevational view, partly in vertical section of the structure shown in Figure 2. The sectional portion of the view is for the purpose of more clearly disclosing the internal construction of the device; and the plane in which the view is taken is indicated by the line 3—3 of Figure 2.

In Figure 1, I have shown a portion of the floor structure 4 of the driver's compartment of an automobile or the like on which is mounted the pivoted throttle pedal 6 for moving the control rod 7 extending toward and connected for operating the throttle valve of the carburetor. The carburetor itself is not shown in the drawing since its construction and its connection with the control rod 7 are well understood by those skilled in the art, it being sufficient to state that the throttle pedal 6 is capable of movement, about its pivot 8 toward and from the floor 4 thereby causing axial reciprocation of the control rod.

Means is provided situated in the path of movement of the throttle pedal 6 to be engaged thereby, after the latter has been moved a predetermined distance, so as to resist ready movement of the throttle lever beyond said predetermined distance. This means, in the event that the vehicle is not to be driven above a specific speed, along level ground, may comprise a stud projecting upwardly from the floor 4, in such a position as to be contacted by the throttle pedal thereby forming a positive stop against further movement of the pedal, but which is, preferably, a suitably heavy coil spring 9 which passes through the central bore 11 of a contractible hub 12 of a mounting bracket having a flange 13 secured by screws 14 to the floor 4. The bore 11 is provided with a helical groove 16 complementary with and in which the coils of the spring are slidable, when the spring is rotated, so that the spring is threadedly connected with its mounting bracket. The contractible hub 12 may be of any desired construction, but for purposes of illustration is shown with an axial slot 17 and also carries ears 18 which are, respectively, bored and threaded to receive a clamping screw 19 provided with a radially-extending handle 21 by means of which the screw 19 may be manually rotated so as to wedge the ears 18 together and thus clamp the axially split hub 12 about the spring 9 thus securely locking the spring in position.

The spring 9 may be rotated, in its mounting bracket, by loosening the clamping screw 19 so as to raise or lower the upper end of the spring relative to the throttle pedal 6 thus causing engagement between the spring and pedal after the latter has moved a lesser or greater distance along its path of travel. Assuming that the speed of the vehicle is not, under ordinary conditions, to exceed, for example, 40 miles per hour over fairly level roads, the vehicle is set in motion under its own power until such a speed has been reached. This results in the throttle lever 6 being depressed a certain amount of its total distance of travel. With the pedal held in this position, so that the speed of the vehicle is maintained constant, the driver or an assistant loosens the clamping screw 19 and rotates the spring 9 so that the upper end thereof is raised into engagement with the underside of the throttle pedal. The clamping screw 19 is now tightened so as to secure the spring in its adjusted position. During subsequent throttling operations, the throttle pedal may be depressed until it engages the end of the spring 9 whereupon the sudden perceptible increase in force necessary to move the throttle pedal will immediately notify the operator that the maximum speed limit has been reached. However, should the driver require additional speed from the vehicle, in an emergency, he may exert an abnormal pressure with his foot on the throttle pedal 6 thus causing axial compression of that portion of the spring 9 lying between the throttle pedal and the spring mounting bracket with the result that the carburetor throttle valve is opened wider than normally thus causing a speeding up of the vehicle engine.

Although I have shown the governor of the invention incorporated in the throttling system of an automobile or the like, it will be understood that it may be effectively employed in any powered mechanism whose speed is to be controlled, provided the mechanism is provided with a movable operating lever similar to the throttle pedal 6 shown.

Having thus described my invention in detail, what I claim as new, and desire to secure by Letters Patent, is:

1. In combination, a control lever pivotally mounted on a support and movable along an operative path toward and from said support, a fixed bracket mounted on said support adjacent said control lever, said bracket having therein an aperture peripherally threaded to threadedly receive the coils of a coil spring passing concentrically through said aperture, said bracket having a slot extending therethrough axially of said aperture and being further provided with a pair of spaced integral ears disposed on opposite sides of said slot, a clamping screw, respectively, journaled in an aperture provided in one of said ears and threadedly engaging a threaded aperture provided in the other ear for radially compressing said aperture so as to clamp said coil spring therein, and said coil spring having an end thereof positioned in the path of movement of, and to be engaged by, said control lever.

2. In a speed governor of the character described, a throttle pedal stop having in combination a bracket member provided with a floor engaging portion and a contractible hub portion having an internally threaded bore, a helical spring having its convolutions in rotative engagement with the threads of the bore, whereby the spring may be adjusted to different positions within said bore, and means for contracting said hub so as to lock said spring against rotative movement within the bore.

3. In a speed governor of the character described, a throttle pedal stop having in combination a bracket member provided with a floor engaging flange and a split hub portion having an internally threaded bore, a helical spring having coils complemental to the path of the threads of said bore and rotatively engaging said threads, whereby the spring may be axially adjusted with respect to said bore, and clamp means for reducing the diameter of the split hub, so that the latter will so grip said spring as to prevent rotative movement thereof.

GORDON E. WILKINS.